(12) United States Patent
Yin et al.

(10) Patent No.: US 10,104,358 B2
(45) Date of Patent: Oct. 16, 2018

(54) 3D IMAGE DISPLAY METHOD AND HEAD-MOUNTED DEVICE

(71) Applicant: QINGDAO GOERTEK TECHNOLOGY CO., LTD., Qingdao (CN)

(72) Inventors: Qi Yin, Qindao (CN); Hongwei Zhou, Qingdao (CN)

(73) Assignee: QINGDAO GOERTEK TECHNOLOGY CO., LTD., Qingdao (CN)

( * ) Notice: Subject to any disclaimer, the term of this patent is extended or adjusted under 35 U.S.C. 154(b) by 108 days.

(21) Appl. No.: 15/324,247

(22) PCT Filed: Dec. 28, 2015

(86) PCT No.: PCT/CN2015/099194
§ 371 (c)(1),
(2) Date: Jan. 5, 2017

(87) PCT Pub. No.: WO2016/107519
PCT Pub. Date: Jul. 7, 2016

(65) Prior Publication Data
US 2017/0201734 A1    Jul. 13, 2017

(30) Foreign Application Priority Data

Dec. 31, 2014 (CN) .......................... 2014 1 0854774

(51) Int. Cl.
*H04N 13/00* (2018.01)
*H04N 13/122* (2018.01)
(Continued)

(52) U.S. Cl.
CPC ....... *H04N 13/122* (2018.05); *H04N 13/0011* (2013.01); *H04N 13/0018* (2013.01);
(Continued)

(58) Field of Classification Search
USPC ................................................ 348/42–43, 51
See application file for complete search history.

(56) References Cited

U.S. PATENT DOCUMENTS

| 2008/0175515 | A1* | 7/2008 | Hartmann ............ G06K 9/3275 382/289 |
| 2012/0044260 | A1 | 2/2012 | Hirai et al. |

(Continued)

FOREIGN PATENT DOCUMENTS

| CN | 101309389 A | 11/2008 |
| CN | 101605271 A | 12/2009 |

(Continued)

OTHER PUBLICATIONS

International Search Report (PCT/ISA/210) dated Mar. 24, 2016, by the State Intellectual Property Office of the P.R. China as the International Searching Authority for International Application No. PCT/CN2015/099194.
(Continued)

*Primary Examiner* — Nigar Chowdhury
(74) *Attorney, Agent, or Firm* — Buchanan Ingersoll & Rooney PC (57) ABSTRACT

A 3D image display method and a head-mounted device. The method including: building a 3D background model and setting a video image display area in the 3D background model; acquiring video image data, and projecting the video image data into the video image display area of the 3D background model; acquiring a display parameter of a head-mounted device, and according to the display parameter, performing image morphing processing of the 3D background model to which the video image data are projected to generate a first 3D video image corresponding to a left eye and a second 3D video image corresponding to a right eye; and displaying the first 3D video image and the second 3D video image in the video image display area after refracting them through two lenses, respectively. The above-
(Continued)

mentioned technical solutions can solve the problem of the narrow 3D image display angle that in the existing head-mounted devices.

9 Claims, 5 Drawing Sheets

(51) Int. Cl.
*H04N 13/04* (2006.01)
*H04N 13/111* (2018.01)
*H04N 13/133* (2018.01)
*H04N 13/339* (2018.01)
*H04N 13/344* (2018.01)

(52) U.S. Cl.
CPC ....... *H04N 13/0025* (2013.01); *H04N 13/044* (2013.01); *H04N 13/0436* (2013.01); *H04N 13/111* (2018.05); *H04N 13/133* (2018.05); *H04N 13/339* (2018.05); *H04N 13/344* (2018.05)

(56) References Cited

U.S. PATENT DOCUMENTS

2013/0050065 A1 2/2013 Shimizu
2014/0055353 A1 2/2014 Takahama

FOREIGN PATENT DOCUMENTS

| CN | 102238396 A | 11/2011 |
| CN | 102438157 A | 5/2012 |
| CN | 102967937 A | 3/2013 |
| CN | 104581119 A | 4/2015 |
| WO | WO 2014/199155 A1 | 12/2014 |

OTHER PUBLICATIONS

Written Opinion (PCT/ISA/237) dated Mar. 24, 2016, by the State Intellectual Property Office of the P.R. China as the International Searching Authority for International Application No. PCT/CN2015/099194.

English translation of First Office Action dated Mar. 4, 2016, by the State Intellectual Property Office of the P.R. of China in corresponding Chinese Patent Application No. 201410854774.0. (6 pages).

English translation of Second Office Action dated Nov. 22, 2016, by the State Intellectual Property Office of the P.R. of China in corresponding Chinese Patent Application No. 201410854774.0. (6 pages).

\* cited by examiner

3D IMAGE DISPLAY METHOD AND HEAD-MOUNTED DEVICE

TECHNICAL FIELD

The present disclosure relates to the technical field of 3D image display, and particularly, to a 3D image display method and a head-mounted device.

BACKGROUND

In recent years, head-mounted display devices are increasingly popular and have become the tools for more users to experience home theater. However, traditional head-mounted display devices focus on displaying the movie content, and the users will not feel like watching movies in a theater.

Traditional head-mounted devices process 3D videos by performing a fuzzy processing of the edge portion of each frame of an image, but that will cause the problems that the edge portion of the 3D video image is fussy, and the 3D image display angle is narrow.

As can be seen from the above descriptions, the existing head-mounted devices have the problem that the 3D image display angle is narrow.

SUMMARY OF THE DISCLOSURE

The present disclosure provides a 3D image display method and a head-mounted device, so as to solve the problem of the narrow 3D image display angle that in the existing head-mounted devices.

In order to achieve the above objective, the technical solutions of the present disclosure are realized as follows:

The present disclosure discloses a 3D image display method, comprising:

building a 3D background model and setting a video image display area in the 3D background model;

acquiring video image data, and projecting the video image data into the video image display area of the 3D background model;

acquiring a display parameter of a head-mounted device, and according to the display parameter, performing image morphing processing of the 3D background model to which the video image data are projected to generate a first 3D video image corresponding to a left eye and a second 3D video image corresponding to a right eye; and displaying the first 3D video image and the second 3D video image in the video image display area after refracting them through two lenses, respectively.

Optionally, after generating the first video display area corresponding to a left eye and the second video display area corresponding to a right eye, the method further comprises:

performing image smoothing processing of an edge portion of the first 3D video image corresponding to the left eye and an edge portion of the second 3D video image corresponding to the right eye; and in the video image display area, displaying the first 3D video image and the second 3D video image after the image smoothing processing.

Optionally the performing image morphing processing of the 3D background model to which the video image data are projected to generate a first 3D video image corresponding to a left eye and a second 3D video image corresponding to a right eye comprises:

generating a first box body and a second box body according to a length value and a width value of a display area of the head-mounted device;

performing image morphing processing of the 3D background model which displays the video image data to generate first video data corresponding to the left eye and second video data corresponding to the right eye; and placing the first video data in the first box body to generate the first 3D video image corresponding to the left eye; and placing the second video data in the second box body to generate the second 3D video image corresponding to the right eye.

Optionally, the performing image smoothing processing of an edge portion of the first 3D video image corresponding to the left eye and an edge portion of the second 3D video image corresponding to the right eye comprises:

performing image smoothing processing of the edge portion of the first 3D video image and the edge portion of the second 3D video image by a convolution smoothing algorithm;

wherein, the edge portion of the first 3D video image refers to an area having a distance to a center of the first 3D video image larger than a preset value, and the edge portion of the second 3D video image refers to an area having a distance to a center of the second 3D video image larger than a preset value.

Optionally, the performing image smoothing processing of the edge portion of the first 3D video image and the edge portion of the second 3D video image by a convolution smoothing algorithm comprises:

for each pixel point in the edge portion of the first 3D video image and the edge portion of the second 3D video image, gathering pixel points around the pixel point to form a pixel neighborhood matrix; and performing a weighted calculation for the pixel neighborhood matrix and a preset convolution weight value matrix to obtain a new value, and replacing an original value of the pixel point with the new value.

Optionally, the method further comprises: providing an eye observation position matrix;

acquiring an offset angle of visual angle, and modifying the eye observation position matrix according to the offset angle of visual angle;

according to the eye observation position matrix, performing a matrix operation on a vertex of the 3D background model to obtain a new vertex; and performing shading processing of the new vertex to generate a 3D background model corresponding to the visual angle.

Optionally, the method further comprises: acquiring a visual angle translation parameter, and performing a translation operation on the 3D background model according to the visual angle translation parameter, to obtain a new 3D background model.

Optionally, the 3D background model is a 3D theater model;

wherein a screen model in the 3D theater model is a corresponding video image display area.

The present disclosure further discloses a head-mounted device, comprising:

a background processing module configured to build a 3D background model and set a video image display area in the 3D background model;

a gathering and processing module connected to the background processing module and configured to acquire video image data, and project the video image data into the video image display area of the 3D background model, and configured to gather a display parameter of the head-mounted device, and send the display parameter of the head-mounted device to the image processing module;

an image processing module connected to the gathering and processing module, and configured to, according to the display parameter, perform image morphing processing of the 3D background model to which the video image data are projected to generate a first 3D video image corresponding to a left eye and a second 3D video image corresponding to a right eye; and a displaying module connected to the image processing module and configured to display the first 3D video image and the second 3D video image in the video image display area after refracting them through two lenses, respectively.

Optionally, the image processing module is further configured to generate a first box body and a second box body according to a length value and a width value of a display area of the head-mounted device; perform image morphing processing of the 3D background model which displays the video image data to generate first video data corresponding to the left eye and second video data corresponding to the right eye; place the first video data in the first box body to generate the first 3D video image corresponding to the left eye, and place the second video data in the second box body to generate the second 3D video image corresponding to the right eye; and perform image smoothing processing of an edge portion of the first 3D video image and an edge portion of the second 3D video image.

Optionally, the head-mounted device further comprises a visual angle adjusting module connected to the image processing module and configured to provide an eye observation position matrix, and after acquiring an offset angle of visual angle, modify the eye observation position matrix according to the offset angle of visual angle;

wherein the image processing module is further configured to, according to the eye observation position matrix, perform a matrix operation on a vertex of the 3D background model to obtain a new vertex; and perform shading processing of the new vertex to generate a 3D background model corresponding to the visual angle.

In conclusion, in the technical solutions provided by the present disclosure, a 3D background model is provided, and image morphing processing is performed for the 3D background model to which the video image data are projected to generate a first 3D video image and a second 3D video image, so that the user can watch within a wide visual angle through the lenses in the head-mounted device, thereby improving the user experience and solving the problem that when a 3D video is watched with the existing head-mounted device, the visual angle is narrow and the edges are fussy.

BRIEF DESCRIPTION OF THE DRAWINGS

The drawings are provided for a further understanding of the present disclosure, and constitute part of the Specification. The drawings are used together with the embodiments of the present disclosure to explain the present disclosure, rather than making any limitation to the present disclosure, in which.

DETAILED DESCRIPTION

In order that the objective, technical solutions and advantages of the present disclosure are clearer, the embodiments of the present disclosure will be further described in details as follows with reference to the drawings.

Figure 1:
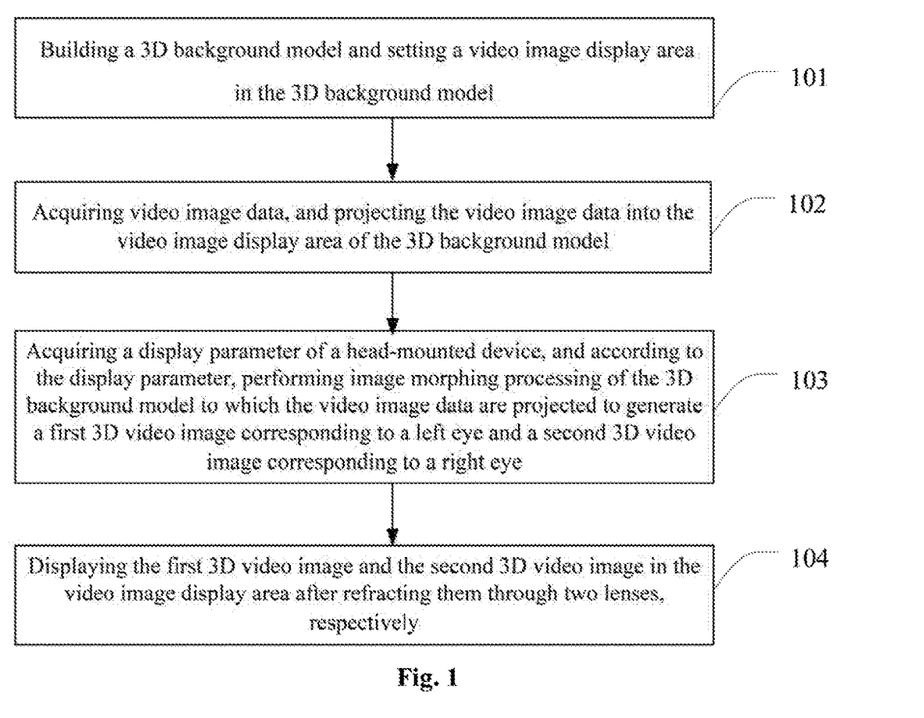
FIG. 1 is a flow diagram of a 3D image display method in the present disclosure.

FIG. 1 is a flow diagram of a 3D image display method in the present disclosure. As illustrated in FIG. 1, the method comprises the following steps.

Step 101: building a 3D background model and setting a video image display area in the 3D background model.

Step 102: acquiring video image data, and projecting the video image data into the video image display area of the 3D background model.

Step 103: acquiring a display parameter of a head-mounted device, and according to the display parameter, performing image morphing processing of the 3D background model to which the video image data are projected to generate a first 3D video image corresponding to a left eye and a second 3D video image corresponding to a right eye.

Step 104: displaying the first 3D video image and the second 3D video image in the video image display area after refracting them through two lenses, respectively.

As can be seen from the above descriptions, a 3D image display method disclosed by the present disclosure is adaptive to the head-mounted device. Depending on the viewpoint of human eyes, the video image display area is provided in the 3D background model, and the acquired video image data are projected into the video image display area of the 3D background model, image morphing processing is performed for the 3D background model to which the video image data are projected to generate the first 3D video image and the second 3D video image, so that the user can watch within a wide visual angle through the lenses in the head-mounted device. In addition, by providing the 3D background model, the user feels immersive when watching a video, thereby improving the user experience.

Figure 2:
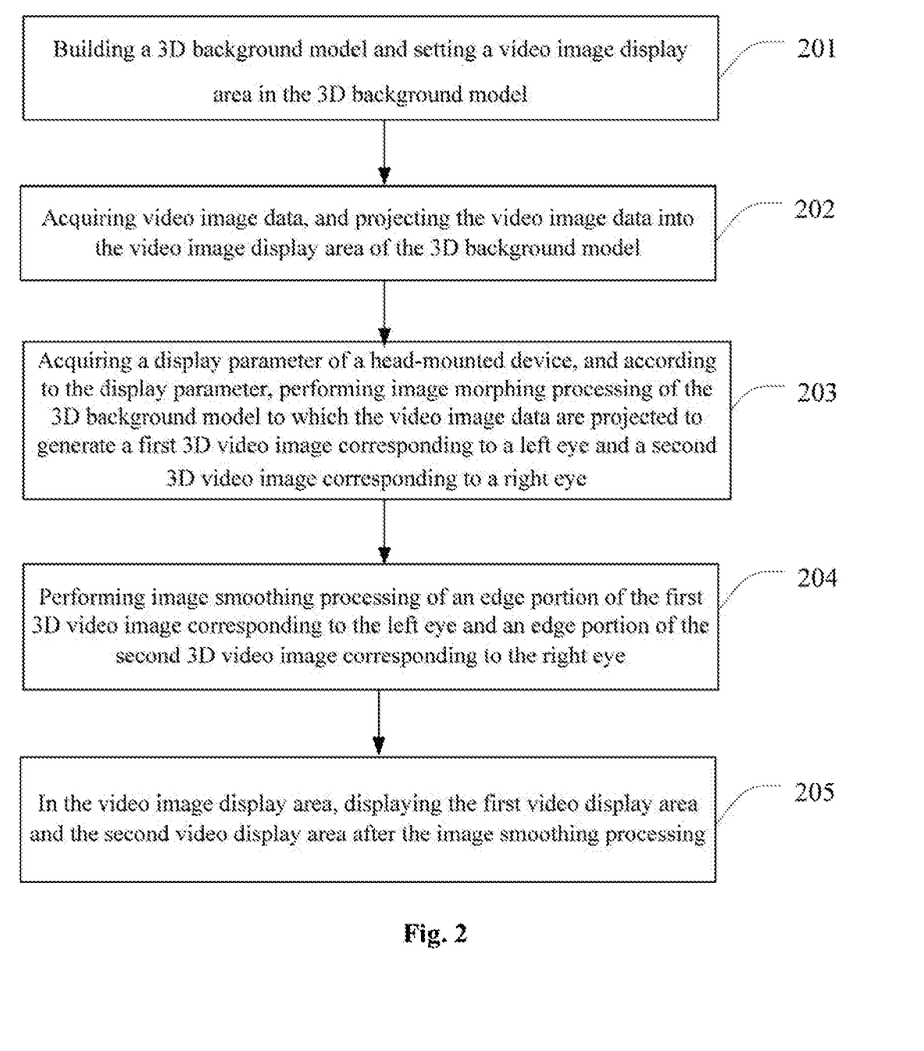
FIG. 2 is a detailed flow diagram of a 3D image display method in the present disclosure.

FIG. 2 is a detailed flow diagram of a 3D image display method in the present disclosure. As illustrated in FIG. 2, the method comprises the following steps.

Step 201: building a 3D background model and setting a video image display area in the 3D background model.

In an embodiment of the present disclosure, the 3D background model may be a theater 3D model, i.e., including 3D models such as screen, seat, etc., wherein the video image display area of the 3D background model is corresponding to the screen model of the theater 3D model.

Step 202: acquiring video image data, and projecting the video image data into the video image display area of the 3D background model.

In Step 202, video image data to be played are acquired and projected into the screen model of the theater 3D model, i.e., when watching a video through a head-mounted device, the user will see the screen in the theater 3D model, and the corresponding video is played on the screen to achieve the effect of an immersive watching of the video.

Step 203: acquiring a display parameter of a head-mounted device, and according to the display parameter, performing image morphing processing of the 3D background model to which the video image data are projected to generate a first 3D video image corresponding to a left eye and a second 3D video image corresponding to a right eye.

In an embodiment of the present disclosure, the display parameter of the bead-mounted device is the length value and the width value of the display area of the head-mounted device.

In Step 203, the method comprises, according to the length value and the width value of the display area of the head-mounted device, generating a first box body and a second box body performing image morphing processing of the 3D background model which displays the video image data to generate first video data corresponding to the left eye and second video data corresponding to the right eye; placing the first video data in the first box body to generate the first 3D video image corresponding to the left eye; and placing the second video data in the second box body to generate the second 3D video image corresponding to the right eye.

In the above embodiment of the present disclosure, by generating the first box body and the second box body on the display screen of the head-mounted device, the first 3D video image and the second 3D video image are displayed in the first box body and the second box body, respectively, so that the human eyes can watch the theater 3D models respectively displayed in the first 3D video image and the second 3D video image within a wide visual angle through the optical lenses, i.e., an IMAX movie watching effect can be achieved.

Step 204: performing image smoothing processing of an edge portion of the first 3D video image and an edge portion of the second 3D video image.

In Step 204, in order to prevent the problem of that the 3D image seen by the human eyes through the optical lenses is distorted by saw teeth occurring at the edge portion of the generated first 3D video image and the edge portion of the generated second 3D video image after the image morphing processing of the theater 3D model which displays the video image data in the screen, image smoothing processing shall be performed for the edge portion of the first 3D video image and the edge portion of the second 3D video image.

In an embodiment of the present disclosure, a convolution smoothing algorithm may be employed to perform the image smoothing processing of the edge portion of the first video display area and the edge portion of the second video display area.

Step 205: displaying the first video display area and the second video display area after the image smoothing processing.

In Step 205, in the video image display area, the first 3D video image and the second 3D video image after the image smoothing processing are displayed on the display screen of the head-mounted device.

In a specific embodiment of the present disclosure, in Step 203, image morphing processing is performed for the theater 3D model which displays the video image data on its screen, according to the size of the display screen of the head-mounted device. In addition, on the display screen of the head-mounted device, a first box body (Mesh) corresponding to the left eye is generated for placing the first 3D video image therein, and a second box body (Mesh) corresponding to the right eye is generated for placing the second 3D video image therein. Since the viewpoints of the left and right eyes of the human body are different from each other, the theater 3D model displayed in the first video display area is different from the theater 3D model displayed in the second video display area. Thus, when the human eyes watch the theater 3D models respectively displayed in the first 3D video image and the second 3D video image through optical lenses, the human brain can recognize the contents respectively displayed in the first 3D video image and the second 3D video image, so as to produce a real effect of the theater 3D model.

The method provided by the present disclosure enables the user to feel like watching a movie in a theater when wearing the head-mounted device. Besides the watching, the size and angle of the watched movie may be varied with the selected visual angle, and the 3D video content is displayed in the 3D background model to enhance the sense of reality.

Figure 3:
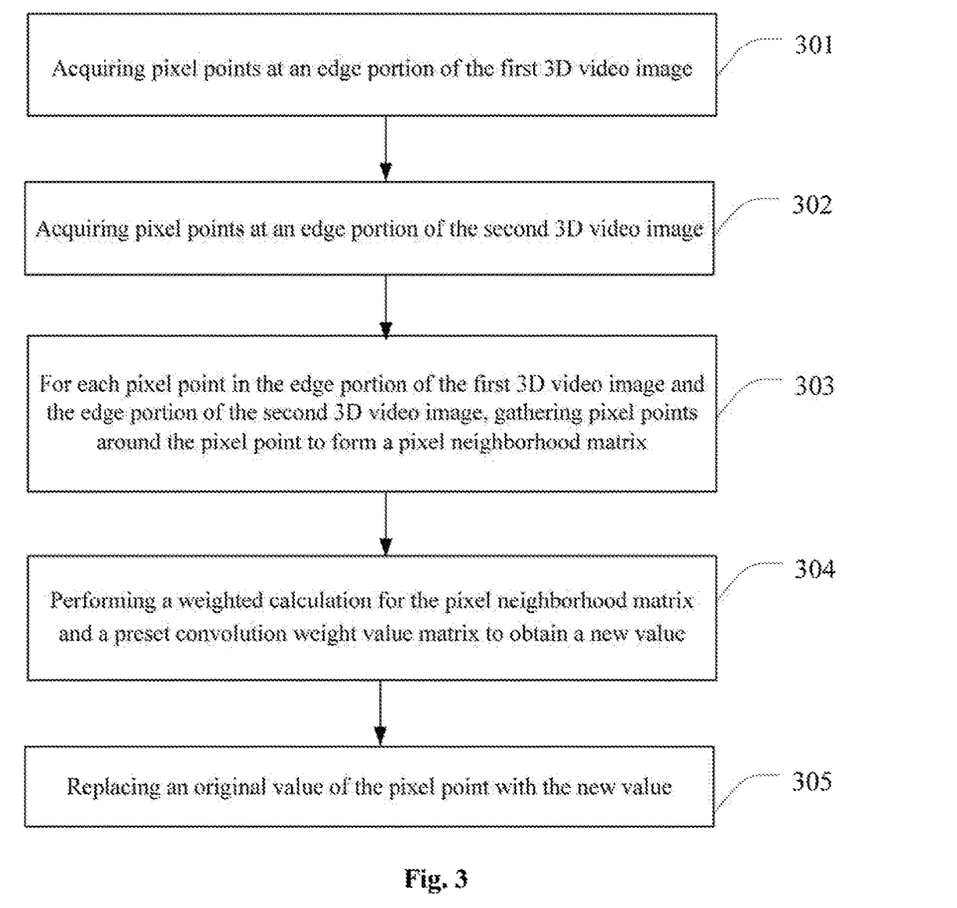
FIG. 3 is a flow diagram of 3D video image smoothing processing in the present disclosure.

FIG. 3 is a flow diagram of 3D video image smoothing processing in the present disclosure. In a specific embodiment of the present disclosure, as illustrated in FIG. 3, in order to better perform the image smoothing processing of the edge portion of the first 3D video image and the edge portion of the second 3D video image, the method comprises the following steps.

Step 301: acquiring pixel points at an edge portion of the first 3D video image.

In Step 301, the edge portion of the first 3D video image refers to an area having a distance to a center of the first 3D video image larger than a preset value.

Step 302: acquiring pixel points at an edge portion of the second 3D video image.

In Step 302, the edge portion of the second 3D video image refers to an area having a distance to a center of the second 3D video image larger than a preset value. In a preferred embodiment of the present disclosure, the preset values in Steps 301 and 302 may be a half of the distance from the farthest pixel pint to the center point.

Step 303: for each pixel point in the edge portion of the first 3D video image and the edge portion of the second 3D video image, gathering pixel points around the pixel point to form a pixel neighborhood matrix.

In Step 303, eight pixel points around the target pixel point may be gathered to form a 3×3 pixel neighborhood matrix. In other embodiments of the present disclosure, more pixel points may be gathered to form a larger pixel neighborhood matrix, thereby achieving a better image smoothing effect.

Step 304: performing a weighted calculation for the pixel neighborhood matrix and a preset convolution weight value matrix to obtain a new value.

In Step 304, the preset convolution weight value matrix is corresponding to the gathered pixel neighborhood matrix, and the convolution weight value matrix sets a different weight value for each pixel point in the gathered pixel neighborhood matrix, wherein the weight value of the target pixel point is the maximum.

Step 305: replacing all original value of the pixel point with the new value.

In an embodiment of the present disclosure. Step 301 and Step 302 are not necessarily in that order and can be performed simultaneously. In addition, the processing efficiency of the CPU can be improved by executing a convolution smoothing operation merely on the pixel points located beyond the area of a half of the distance from the farthest pixel pint to the center point and not processing the pixel points located within the above area, so that the 3D video can be watched more smoothly.

Figure 4:
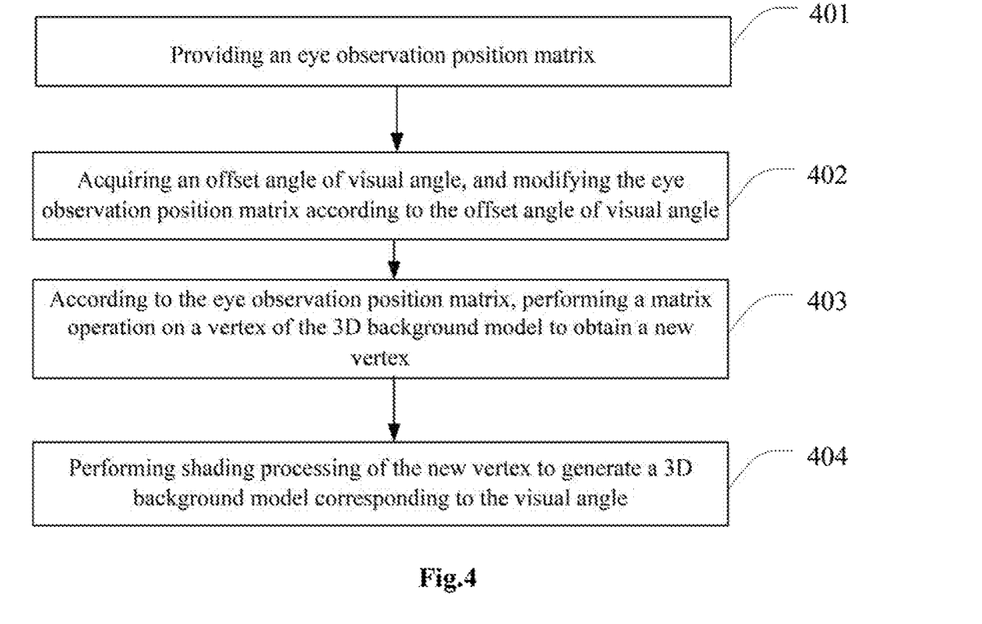
FIG. 4 is a flow diagram of a visual angle transformation of a 3D image display in the present disclosure.

In an embodiment of the present disclosure, in order to achieve the effect of watching a 3D image at different angles, an eye observation position matrix may be constructed to change the visual angle. FIG. 4 is a flow diagram of a visual angle transformation of a 3D image display in the present disclosure. As illustrated in FIG. 4, the method comprises the following steps.

Step 401: providing an eye observation position matrix.

Step 402: acquiring an offset angle of visual angle, and modifying the eye observation position matrix according to the offset angle of visual angle.

Step 403: according to the eye observation position matrix, performing a matrix operation on a vertex of the 3D background model to obtain a new vertex.

Step 404: performing shading processing of the new vertex to generate a 3D background model corresponding to the visual angle.

In an embodiment of the present disclosure, after acquiring an offset angle of visual angle, the eye observation position matrix may be modified by calling Matrix.setLookAem, so as to change the user's observation angle to the 3D background model. Specifically, a matrix operation is performed on a vertex V (a 3D vector) of the 3D background model by an eye observation position matrix M to obtain a new vertex V' (V'=M*V), and a vertex shader processes the new vertex V', for example, gl_Position=M*(V,1.0).

Figure 5:
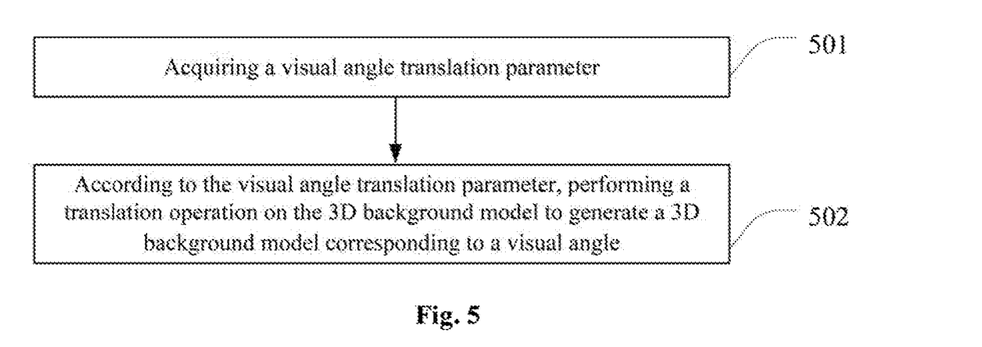
FIG. 5 is a flow diagram of another visual angle transformation of a 3D image display in the present disclosure.

In an embodiment of the present disclosure, in order to achieve the effect of watching a 3D image at different angles, a 3D background model movement matrix may be provided to change the visual angle. FIG. 5 is a flow diagram of another visual angle transformation of a 3D image display in the present disclosure. As illustrated in FIG. 5, the method comprises the following steps.

Step 501: acquiring a visual angle translation parameter.

Step 502: according to the visual angle translation parameter, performing a translation operation on the 3D background model to generate a 3D background model corresponding to a visual angle.

In an embodiment of the present disclosure, an original vertex V=[x, y z] of the 3D background model has visual angle translation parameters [x', y', z'], which indicate moving by x', y' and z' in the world coordinate system. After the translation operation is performed on the 3D background model according to the visual angle translation parameters, V'=[x+x', y+y', z+z'].

In other embodiments of the present disclosure, the visual angle transformation of the 3D image is not limited to the above techniques. Due to the duality property of the transformation, the visual angle transformation of the 3D image may also be realized in other manners. For example, moving the screen position along the positive direction of axis z of the world coordinate system is equivalent to moving an eye observation position along the negative direction of axis z.

Figure 6:
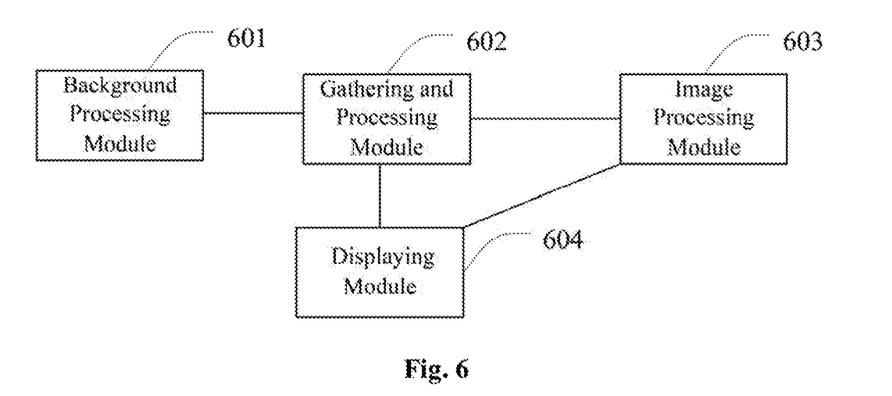
FIG. 6 is a structural diagram of a head-mounted device in the present disclosure.

The present disclosure further discloses a head-mounted device. FIG. 6 is a structural diagram of a head-mounted device in the present disclosure. As illustrated in FIG. 6, the head-mounted device comprises a background processing module 601, a gathering and processing module 602, an image processing module 603 and a displaying module 604.

The background processing module 601 is configured to build a 3D background model and set a video image display area in the 3D background model.

The gathering and processing module 602 is connected to the background processing module 601 and configured to acquire video image data, and project the video image data into the video image display area of the 3D background model, and configured to gather a display parameter of the head-mounted device, and send the display parameter of the head-mounted device to the image processing module 603.

The image processing module 603 is connected to the gathering and processing module 602, and configured to, according to the display parameter, perform image morphing processing of the 3D background model to which the video image data are projected to generate a first 3D video image corresponding to a left eye and a second 3D video image corresponding to a right eye and send them to the displaying module 604.

The displaying module 604 is connected to the image processing module 603 and configured to display the first 3D video image and the second 3D video image in the video image display area after refracting them through two lenses, respectively.

Figure 7:
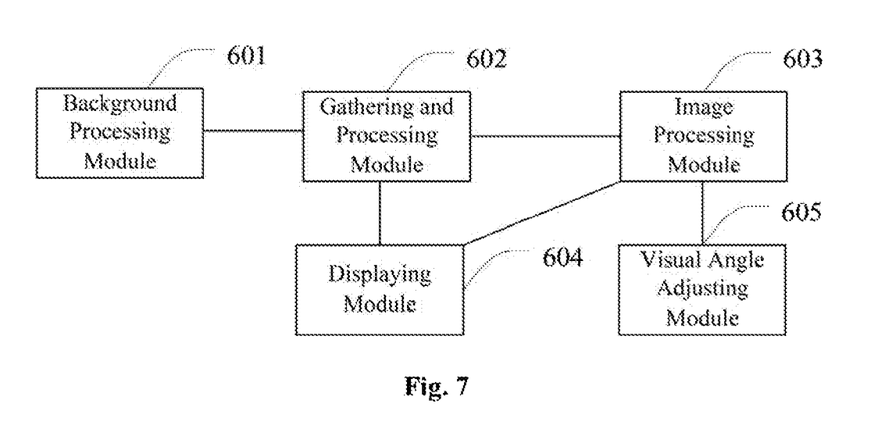
FIG. 7 is a detailed structural diagram of the head-mounted device in the present disclosure.

FIG. 7 is a detailed structural diagram of the head-mounted device in the present disclosure.

As illustrated in FIG. 7, in an embodiment of the present disclosure, the image processing module 603 generates a first box body and a second box body according to the length value and the width value of the display area of the head-mounted device; performs image morphing processing of the 3D background model which displays the video image data to generate first video data corresponding to the left eye and second video data corresponding to the right eye; places the first video data in the first box body to generate the first 3D video image corresponding to the left eye; and places the second video data in the second box body to generate the second 3D video image corresponding to the right eye.

In order to achieve a better watching effect when the human eyes watch the first 3D video image and the second 3D video image through optical lenses, in an embodiment of the present disclosure, the image processing module 603 performs image smoothing processing of an edge portion of the first 3D video image and an edge portion of the second 3D video image.

In another embodiment of the present disclosure, the image processing module 603 performs image smoothing processing of the edge portion of the first 3D video image and the edge portion of the second 3D video image by a convolution smoothing algorithm.

In that, the edge portion of the first 3D video image refers to an area having a distance to a center of the first 3D video image larger than a preset value, and the edge portion of the second 3D video image refers to an area having a distance to a center of the second 3D video image larger than a preset value.

In an embodiment of the present disclosure, the image processing module 603, for each pixel point in the edge portion of the first 3D video image and the edge portion of the second 3D video image, gathers pixel points around the pixel point to form a pixel neighborhood matrix, performs a weighted calculation for the pixel neighborhood matrix and a preset convolution weight value matrix to obtain a new value, and replaces an original value of the pixel point with the new value.

In order to achieve the effect of watching a 3D video at different angles, in an embodiment of the present disclosure, the head-mounted device further comprises a visual angle adjusting module 605.

The visual angle adjusting module 605 is connected to the image processing module 603 and configured to provide an eye observation position matrix, and after acquiring an offset angle of visual angle, modify the eye observation position matrix according to the offset angle of visual angle.

The image processing module 603 is further configured to, according to the eye observation position matrix, perform a matrix operation on a vertex of the 3D background model to obtain a new vertex, and perform shading processing of the new vertex to generate a 3D background model corresponding to the visual angle.

In another embodiment of the present disclosure, the visual angle adjusting module 605 is configured to acquire a visual angle translation parameter, and send the acquired visual angle translation parameter to the image processing module 603.

The image processing module 603 is configured to perform a translation operation on the 3D background model according to the visual angle translation parameter to obtain a new 3D background model.

As can be seen from the above descriptions, in the technical solutions provided by the present disclosure, a 3D background model is provided, and the image morphing processing is performed for the 3D background model to which the video image data are projected to generate a first 3D video image and a second 3D video image, so that the user can watch within a wide visual angle through the lenses in the head-mounted device, thereby improving the user experience and solving the problem that when a 3D video is watched with the existing head mounted device, the visual angle is narrow. In addition, by performing smoothing processing of the edge portion of the first 3D video image and the edge portion of the second 3D video image, saw teeth will not occur at the edge portion of the 3D video image watched by the user, and the edge portion of the 3D video image will be clearer. Moreover, the present disclosure further provides an eye observation position matrix to achieve a visual angle transformation of the 3D video image, so that the user can select different angels to watch the 3D video image, thereby improving the user experience.

The above descriptions are just preferred embodiments of the present closure, rather than limitations to the protection scope of the present disclosure. Any amendment, equivalent replacement, improvement, etc. made within the spirit and principle of the present disclosure shall fall within the protection scope of the present disclosure.

The invention claimed is:

1. A 3D image display method, comprising:
    building a 3D background model and setting a video image display area in the 3D background model;
    acquiring video image data, and projecting the video image data into the video image display area of the 3D background model;
    acquiring a display parameter of a head-mounted device, and according to the display parameter, performing image morphing processing of the 3D background model to which the video image data are projected to generate a first 3D video image corresponding to a left eye and a second 3D video image corresponding to a right eye; and
    displaying the first 3D video image and the second 3D video image in the video image display area after refracting them through two lenses, respectively;
    providing an eye observation position matrix;
    acquiring an offset angle of visual angle, and modifying the eye observation position matrix according to the offset angle of visual angle;
    according to modified eye observation position matrix, performing a matrix operation on a vertex of the 3D background model to obtain a new vertex; and
    performing shading processing of the new vertex to generate a 3D background model corresponding to the visual angle.

2. The method according to claim 1, wherein after generating the first video display area corresponding to a left eye and the second video display area corresponding to a right eye, the method further comprises:
    performing image smoothing processing of an edge portion of the first 3D video image corresponding to the left eye and an edge portion of the second 3D video image corresponding to the right eye; and
    in the video image display area, displaying the first 3D video image and the second 3D video image after the image smoothing processing.

3. The method according to claim 2, wherein the performing image morphing processing of the 3D background model to which the video image data are projected to generate a first 3D video image corresponding to a left eye and a second 3D video image corresponding to a right eye comprises:
    generating a first box body and a second box body according to a length value and a width value of a display area of the head-mounted device;
    performing image morphing processing of the 3D background model which displays the video image data to generate first video data corresponding to the left eye and second video data corresponding to the right eye; and
    placing the first video data in the first box body to generate the first 3D video image corresponding to the left eye; and placing the second video data in the second box body to generate the second 3D video image corresponding to the right eye.

4. The method according to claim 2, wherein the performing image smoothing processing of an edge portion of the first 3D video image corresponding to the left eye and an edge portion of the second 3D video image corresponding to the right eye comprises:
    performing image smoothing processing of the edge portion of the first 3D video image and the edge portion of the second 3D video image by a convolution smoothing algorithm;
    wherein, the edge portion of the first 3D video image refers to an area having a distance to a center of the first 3D video image larger than a preset value, and the edge portion of the second 3D video image refers to an area having a distance to a center of the second 3D video image larger than a preset value.

5. The method according to claim 4, wherein the performing image smoothing processing of the edge portion of the first 3D video image and the edge portion of the second 3D video image by a convolution smoothing algorithm comprises:
    for each pixel point in the edge portion of the first 3D video image and the edge portion of the second 3D video image, gathering pixel points around the pixel point to form a pixel neighborhood matrix; and
    performing a weighted calculation for the pixel neighborhood matrix and a preset convolution weight value matrix to obtain a new value, and replacing an original value of the pixel point with the new value.

6. The method according to claim 1, further comprising:
    acquiring a visual angle translation parameter, and performing a translation operation on the 3D background model according to the visual angle translation parameter, to obtain a new 3D background model.

7. The method according to claim 1, wherein the 3D background model is a 3D theater model; and
    wherein a screen model in the 3D theater model is a corresponding video image display area.

8. A head-mounted device, comprising:
    a background processing module configured to build a 3D background model and set a video image display area in the 3D background model;

a gathering and processing module connected to the background processing module and configured to acquire video image data, and project the video image data into the video image display area of the 3D background model, and configured to gather a display parameter of the head-mounted device, and send the display parameter of the head-mounted device to the image processing module;

an image processing module connected to the gathering and processing module, and configured to, according to the display parameter, perform image morphing processing of the 3D background model to which the video image data are projected to generate a first 3D video image corresponding to a left eye and a second 3D video image corresponding to a right eye; and a displaying module connected to the gathering and processing module and the image processing module and configured to display the first 3D video image and the second 3D video image in the video image display area after refracting them through two lenses, respectively; and a visual angle adjusting module connected to the image processing module and configured to provide an eye observation position matrix, and after acquiring an offset angle of visual angle, modify the eye observation position matrix according to the offset angle of visual angle;

wherein the image processing module is further configured to, according to modified eye observation position matrix, perform a matrix operation on a vertex of the 3D background model to obtain a new vertex; and perform shading processing of the new vertex to generate a 3D background model corresponding to the visual angle.

9. The head-mounted device according to claim 8, wherein, the image processing module is further configured to generate a first box body and a second box body according to a length value and a width value of a display area of the head-mounted device; perform image morphing processing of the 3D background model which displays the video image data to generate first video data corresponding to the left eye and second video data corresponding to the right eye; place the first video data in the first box body to generate the first 3D video image corresponding to the left eye, and place the second video data in the second box body to generate the second 3D video image corresponding to the right eye; and perform image smoothing processing of an edge portion of the first 3D video image and an edge portion of the second 3D video image.

* * * * *